United States Patent [19]

Poirier

[11] Patent Number: 4,631,088
[45] Date of Patent: Dec. 23, 1986

[54] ROAD ASPHALT COMPOSITIONS CONTAINING VISBREAKING RESIDUES

[75] Inventor: Marc-André Poirier, Ottawa, Canada

[73] Assignee: Her Majesty the Queen in right of Canada, as represented by the Minister of Energy, Mines and Resources, Ottawa, Canada

[21] Appl. No.: 807,792

[22] Filed: Dec. 11, 1985

[51] Int. Cl.$^4$ ................................................ C08L 95/00
[52] U.S. Cl. .................................. 106/273 R; 106/284; 208/22; 208/39
[58] Field of Search ............ 106/273 R, 284; 208/22, 208/39, 44

[56] References Cited

U.S. PATENT DOCUMENTS

| | | | |
|---|---|---|---|
| 2,223,776 | 12/1940 | Anderson | 196/74 |
| 2,687,986 | 8/1954 | Jennings et al. | 208/76 |
| 2,701,213 | 2/1955 | Neville | 106/278 |
| 3,087,887 | 4/1963 | Corbett et al. | 208/39 |
| 3,374,104 | 3/1968 | Baum et al. | 106/273 |
| 3,440,074 | 4/1969 | Stern et al. | 106/279 |
| 3,832,200 | 8/1974 | Kennel et al. | 106/281 R |
| 3,986,887 | 10/1976 | Pitchford | 106/273 R |
| 4,211,576 | 7/1980 | Yan | 106/273 R |
| 4,437,896 | 3/1984 | Partanen | 106/273 R |
| 4,559,128 | 12/1985 | Goodrich | 106/273 R |
| 4,584,023 | 4/1986 | Goodrich | 106/273 R |

*Primary Examiner*—Lorenzo B. Hayes
*Assistant Examiner*—Willie J. Thompson
*Attorney, Agent, or Firm*—Wegner & Bretschneider

[57] ABSTRACT

A road asphalt composition having a penetration at 25° C. in the range of 85 to 100 is made by blending together: (a) a pitch having an initial boiling point of at least 520° C. obtained as a residue in the visbreaking of crude oil, and (b) a distillation residue having a penetration at 25° C. in the range of 150 to 500 obtained in the distillation of crude oil.

7 Claims, No Drawings

ROAD ASPHALT COMPOSITIONS CONTAINING VISBREAKING RESIDUES

BACKGROUND OF THE INVENTION

This invention relates to asphaltic compositions which are suitable for use as road paving materials.

Asphalt is a natural constituent of crude oils and is typically produced from the distillation residues of refining feedstocks. This product is of very significant industrial importance since it is widely used in the construction of roads, building materials and other industrial applications. This asphalt has normally been obtained from conventional petroleum oils.

With the changing economics of the petroleum industry, there is a trend toward the conversion of heavy hydrocarbon oils, such as distillation residues, to light and intermediate naphthas of good quality for reforming feedstocks, fuel oil and gas oils.

Most petroleum refineries have visbreaker units and produce visbreaking pitches, i.e. residues of distillation boiling above 524° C. It has been reported by Giavarini, Fuel, 63, 1515 (1984) that visbreaking residuum by itself is not suitable for road asphalt production as this residuum is very temperature susceptible and is thermally unstable. Nevertheless, this visbreaking residuum would be an attractive component of a road asphalt composition if its deficiencies could be overcome.

Asphalt cement specifications for road paving purposes are given in Table 1 below.

TABLE 1

| | Asphalt cement specifications for road purpose (16-GP-3M) | | | | | | |
|---|---|---|---|---|---|---|---|
| Grade | 85–100 | | 120–150 | | 150–200 | | ASTM |
| Requirements | Min. | Max. | Min. | Max. | Min. | Max. | Method |
| Penetration (25° C., 100 g, 5s) | 85 | 100 | 120 | 150 | 150 | 200 | D 5 |
| Flash point (CO C, °C.) | 230 | — | 220 | — | 220 | — | D 92 |
| Ductility (25° C., 5 cm/min, cm) | 100 | — | 100 | — | 100 | — | D 113 |
| Thin film oven test (Pen. of residue % of original Pen.) | 47 | — | 42 | — | 40 | — | D 1745 |
| Solubility in Trichloroethylene (wt %) | 99.0 | — | 99.0 | — | 99.0 | — | D 2042 |

SUMMARY OF THE INVENTION

It has been found in accordance with the present invention that visbreaking residues can be used as a component of road asphalt compositions when blended with suitable other materials.

Thus, the invention in its broadest aspect relates to a paving grade asphalt composition having a penetration at 25° C. in the range of 85 to 100 which comprises a blend of (a) a petroleum pitch having an initial boiling point of at least 520° C. obtained as a residue in the visbreaking of crude oil, and (b) a distillation residue having a penetration at 25° C. in the range of 150 to 500 obtained in the distillation of crude oil.

The pitches that are used in the present invention are residues of visbreaking which usually boil above 520° C. and they typically come from the visbreaking of regular crude oils. While the pitches which can be used may be derived from visbreaking processes providing a wide range of conversions, they are usually derived from processes having a conversion in the range of about 20 to 35%.

The distillation residue is typically a natural or virgin hydrocarbon product in that it has been subjected to distillation only. The distillation residues should have a minimum penetration at 25° C. of 150 and typically have penetrations in the range of 150 to 500. The distillation residue can obtained from a wide variety of natural or virgin sources, including bitumen from tar sands, heavy oils and from conventional crude oils. The bitumens and heavy oils normally contain a large proportion of materials which boil above 524° C., and a particularly suitable distillation residue is one derived from Athabasca bitumen.

The visbreaking residue and distillation residue can be blended in widely varying proportions, provided the resulting blend meets the specification of Table 1. Normally the composition will contain from 20 to 85% by weight of visbreaking pitch, with a range of 25 to 55% by weight being preferred.

DESCRIPTION OF THE PREFERRED EMBODIMENT

Throughout this specification, certain special terms of the art are used which are defined as follows:

Asphalt Cement Characteristic (Ic)

The Ic is defined as follows $$Ic = \frac{\text{Saturates} + \text{Asphaltenes}}{\text{Aromatics} + \text{Resins}} \text{ wt \%}$$

Asphalt cements typically have Ic value in the range of 0.4 to 0.9.

CRACKING TEMPERATURE OF ASPHALT CEMENTS

An important factor in the cold North American climates is the cracking temperature of asphalt pavement. Based on road tests over 5 years, a nomograph has been developed which allows the prediction of the road cracking temperature of asphalt pavements. This is described in Gaw, et al., "Road Performances After Five Years and Laboratory Predictions of Low Temperature Performance", Proceedings Can. Tech. Asphalt Association, 45 (1974). The cracking temperature is easily calculated by determining the penetration of the asphalt cement at two different temperatures.

COHESIVITY

In surface dressing, aggregates are deposited on a film of asphalt cement on the road. The resistance to the stripping of the aggregates due to traffic is related to a property which can be defined as the cohesivity. For an 85-100 penetration road asphalt cement, the measurement of the cohesivity v. temperature allows the comparison of different asphalt cements.

The cohesivity was determined by the ram pendulum method as described in Marvillet, et al., "Cohesion", Critere d'appreciation des hauts pour enduits "Symposium Eurobitume, Cannes, France, 1981. The method consists of measuring the energy absorbed by the breakage of a cement film. A striped 1 cm² cube representing an aggregate is glued with asphalt cement on a support. The cube over the support allows 1 mm thickness of asphalt cement. The tip of the ram pendulum hits the cube after travelling 180° around a shaft. On impact, the asphalt cement bonded to the support is broken on the median side. A dial fixed to the shaft allows the measurement of the travel of the ram pendulum in degrees.

TEMPERATURE SUSCEPTIBILITY

Thermal susceptibility of asphalt cements is an important characteristic for predicting the behaviour of asphalt pavements. A low temperature susceptibility is most desirable.

The method used for determining temperature susceptibility was that developed by the "Laboratoire Central des Ponts et Chaussees" in France and shown as Method RLB-1-1964 in the text "Bitumes et bitumes fluxes", Dunod 1965. This method is based on the determination of the penetration at different temperatures. The penetration index (PI) is calculated from these data. The PI indicates the thermal susceptibility of asphalt cements.

Certain preferred features of the present invention will be better understood from consideration of the experimental data in the following examples.

EXAMPLE 1

Samples of a variety of blending materials and asphalt cements were obtained as follows:
1. Visbreaking distillation residue (+524° C.), about 30% conversion and obtained from the Petro Canada refinery in Montreal
2. Visbreaking distillation residue (+524° C.), about 30% conversion and obtained from a refinery in France.
3. Asphalt cement 85-100 penetration obtained from the Petro Canada refinery in Montreal
4. Asphalt cement 85-100 penetration obtained from a refinery in France
5. Interprovincial Pipeline Crude (IPL) distillation residue (+427° C.)
6. Athabasca bitumen distillation residue (+371° C.)

Blending

Different blends were prepared using as one component of each blend the visbreaking residue samples described above and as the other component one of the distillation residue samples. These blends were prepared to meet the 85-100 penetration specification of Table 1. The actual blends prepared were as follows:
1. Asphalt cement blend obtained from mixing 68 wt % Sample 1 with 32 wt % Sample 5
2. Asphalt cement blend obtained from mixing 85 wt % Sample 2 with 15 wt % Sample 5
3. Asphalt cement blend obtained from mixing 46 wt % Sample 1 with 54 wt % Sample 6

The above blending materials, blends and asphalt cements had the chemical analyses and physical properties shown in Tables 2, 3 and 4 below.

TABLE 2

| | Composition and properties of the samples | | | | | | | | |
|---|---|---|---|---|---|---|---|---|---|
| Sample | 1 | 2 | 3 | 4 | 5 | 6 | 7 | 8 | 9 |
| Penetration 25° C., 100 q, 5s | 24 | 42 | 85 | 85 | too soft | 245 | 87 | 92 | 93 |
| Predicted cracking temperature, °C. | — | — | −44 | −37 | — | — | −46 | −46 | −39 |
| Cohesivity | | | | | | | | | |
| $T_M$, °C. | — | — | 40 | 43 | — | — | 30 | 35 | — |
| $C_M$, kg/cm² | — | — | 8.7 | 7.7 | — | — | 7.3 | 6.8 | — |
| Penetration Index (PI) | — | — | −0.5 | −0.5 | — | ·— | +1.5 | +0.4 | +0.1 |

TABLE 3

| | Comprehensive analysis of the samples | | | | | | | | |
|---|---|---|---|---|---|---|---|---|---|
| Sample | 1 | 2 | 3 | 4 | 5 | 6 | 7 | 8 | 9 |
| Specific Gravity 15/15° C. | 1.065 | 1.039 | 1.019 | 1.025 | 1.004 | 1.035 | 1.031 | 1.032 | 1.045 |
| Carbon, wt % | 86.21 | 86.50 | 85.19 | 84.93 | 86.10 | 83.21 | 86.48 | 86.17 | 83.98 |
| Hydrogen, wt % | 9.66 | 9.66 | 10.17 | 10.02 | 10.61 | 9.81 | 10.53 | 9.98 | 9.69 |
| Sulphur, wt % | 2.82 | 2.82 | 3.21 | 4.31 | 2.55 | 5.06 | 2.44 | 2.65 | 4.00 |
| Nitrogen, wt % | 0.67 | 0.54 | 0.67 | 0.24 | 0.65 | 0.77 | 0.52 | 0.46 | 1.07 |
| Heptane sol., wt % | 67.6 | 76.0 | 87.0 | 79.1 | 95.2 | 83.4 | 75.3 | 78.4 | 80.9 |
| Heptane insol., wt % | 32.4 | 24.0 | 13.0 | 20.9 | 4.8 | 16.6 | 24.7 | 21.6 | 19.1 |
| Toluene insol., wt % | 1.1 | 0.1 | 0.1 | 0.1 | 0.5 | 0.3 | 0.3 | 1.0 | 0.3 |
| Vanadium, ppm | 410 | 278 | 456 | 82 | 102 | 256 | 266 | 228 | 400 |
| Nickel, ppm | 137 | 101 | 75 | 26 | 55 | 101 | 92 | 68 | 90 |

TABLE 3-continued

| Sample | Comprehensive analysis of the samples | | | | | | | | |
|---|---|---|---|---|---|---|---|---|---|
| | 1 | 2 | 3 | 4 | 5 | 6 | 7 | 8 | 9 |
| Ash, wt % | 0.1 | 0.1 | 0.1 | 0.02 | 0.2 | 0.47 | 0.1 | 0.1 | — |

TABLE 4

| Samples | Physical properties of the samples | | | | | | | | |
|---|---|---|---|---|---|---|---|---|---|
| | 1 | 2 | 3 | 4 | 5 | 6 | 7 | 8 | 9 |
| Penetration 25° C., 100 q, 5s | 24 | 42 | 85 | 80 | Too Soft | 245 | 87 | 92 | 93 |
| Ductility 25° C., 5 cm/mm | — | — | +150 | +150 | — | — | 25 | +150 | +150 |
| Viscosity, 135° C. | Too Viscous | 413 | 307 | 423 | 17 | 87 | 311 | 254 | 282 |
| Flash Point °C., c.o.c. | 308 | 318 | 308 | 325 | 282 | 262 | 360 | 364 | 262 |
| Solubility in trichloroethylene, % | 99.5 | 99.7 | 99.8 | 99.9 | 99.8 | 99.9 | 99.9 | 99.4 | 99.1 |
| Thin Film Oven Test (TFOT) | | | | | | | | | |
| % Original pen. | — | — | 63.3 | 73.9 | — | — | 67.5 | 51.1 | 59.2 |
| Loss on heating, wt % | — | — | 0.04 | 0.04 | — | — | 0.07 | 0.04 | 0.49 |
| Softening Point °C., R&B | 87 | 55 | 42 | 47 | — | — | 54 | 45 | 45 |

The compound type distribution results of the samples are shown in Tables 5 and 6 below.

TABLE 5

| Compound-type distribution of samples (n-heptane solubles, wt %) | | | | |
|---|---|---|---|---|
| Sample | Saturates | Mono-diaromatics | Polyaromatics | Resins |
| 1 | 20.9 | 18.5 | 28.5 | 32.1 |
| 2 | 23.0 | 18.2 | 19.3 | 39.5 |
| 3 | 20.4 | 31.4 | 27.2 | 21.0 |
| 4 | 16.4 | 20.9 | 30.0 | 32.7 |
| 5 | 47.6 | 16.7 | 16.8 | 18.9 |
| 6 | 22.8 | 21.6 | 25.2 | 30.4 |
| 7 | 30.0 | 17.3 | 22.7 | 30.0 |
| 8 | 27.1 | 18.0 | 18.9 | 36.0 |
| 9 | 19.8 | 19.4 | 27.3 | 33.5 |

TABLE 6

| Compound-type distribution of samples | | | | | |
|---|---|---|---|---|---|
| Sample | Saturates | Aromatics | Resins | Asphaltenes | Ic |
| 1 | 14.1 | 31.8 | 21.7 | 32.4 | * |
| 2 | 17.5 | 28.5 | 30.0 | 24.0 | * |
| 3 | 17.7 | 51.0 | 18.3 | 13.0 | 0.44 |
| 4 | 13.0 | 40.2 | 25.9 | 20.9 | 0.51 |
| 5 | 45.3 | 31.9 | 18.0 | 4.8 | * |
| 6 | 19.0 | 39.0 | 25.4 | 16.6 | * |
| 7 | 22.6 | 30.1 | 22.6 | 24.7 | 0.89 |
| 8 | 21.3 | 28.9 | 28.2 | 21.6 | 0.75 |
| 9 | 16.0 | 37.8 | 27.1 | 19.1 | 0.54 |

*Ic is meaningful only for asphalt cement

Gel permeation chromatography (GPC) was used for determining the average molecular weight of the various samples herein. The results of these analyses are shown in Table 7 below.

TABLE 7

| Molecular weight distribution by gel permeation chromatography (GPC) Average Molecular Weight | | | |
|---|---|---|---|
| Sample | Original | Maltenes | Asphaltenes |
| 1 | 690 | 680 | 830 |
| 2 | 690 | 675 | 860 |
| 3 | 1140 | 880 | 3000 |
| 4 | 1970 | 1090 | 4300 |
| 5 | 640 | 560 | 2520 |
| 6 | 1500 | 790 | 3970 |
| 7 | 685 | 640 | 980 |
| 8 | 700 | 920 | 940 |
| 9 | 940 | 710 | 2140 |

It will be seen from the above results that the predicted cracking temperature of asphalt pavements improved by increasing saturates and resins content.

The cohesivity tests indicated that the blends (Samples 7 and 8) are comparable to conventional asphalt cements (Samples 3 and 4).

The temperature susceptibility tests indicated that conventional asphalt cements (Samples 3 and 4) are more temperature susceptible than the blends (Samples 7, 8 and 9). The best product in terms of low temperature susceptibility was the blend prepared in which the distillation residue was obtained from Athabasca bitumen.

I claim:

1. A road asphalt composition having a penetration at 25° C. in the range of 85 to 100 comprising a blend of:
   (a) a pitch having an initial boiling point of at least 520° C. obtained as a residue in the visbreaking of crude oil, and
   (b) a distillation residue having a penetration at 25° C. in the range of 150 to 500 obtained in the distillation of crude oil.

2. A composition according to claim 1 wherein the distillation residue is obtained from the distillation of tar sand bitumen, heavy hydrocarbon oil, or conventional hydrocarbon oil.

3. A composition according to claim 2 wherein the distillation residue is obtained from the distillation of tar sand bitumen or heavy hydrocarbon oil containing a major proportion of material boiling above 524° C.

4. A composition according to claim 2 wherein the distillation residue is obtained from the distillation of tar sand bitumen.

5. A compositon according to claim 2 wherein the visbreaking pitch is present in proportions ranging from about 20 to about 85% by weight of said blend.

6. A composition according to claim 5 wherein the visbreaking pitch is present in proportions ranging from about 25 to about 55% by weight of said blend.

7. A composition according to claim 5 wherein the visbreaking pitch is obtained from a process having a conversion in the range of about 20 to 35%.

* * * * *